United States Patent [19]
Takada et al.

[11] Patent Number: 6,103,916
[45] Date of Patent: Aug. 15, 2000

[54] SILVER CATALYST FOR PRODUCTION OF ETHYLENE OXIDE, METHOD FOR PRODUCTION THEREOF, AND METHOD FOR PRODUCTION OF ETHYLENE OXIDE

[75] Inventors: Hitoshi Takada; Masahide Shima, both of Kanagawa, Japan

[73] Assignee: Nippon Shokubai Co., Ltd., Osaka, Japan

[21] Appl. No.: 09/256,338

[22] Filed: Feb. 19, 1999

[30] Foreign Application Priority Data

Feb. 20, 1998  [JP]  Japan .................................. 10-038327

[51] Int. Cl.[7] .......................... C07D 301/10; B09J 21/04; B09J 21/08
[52] U.S. Cl. .......................... 549/534; 549/536; 502/238; 502/243; 502/348; 502/527
[58] Field of Search ..................... 549/534, 536; 502/238, 243, 348, 527

[56] References Cited

U.S. PATENT DOCUMENTS

| | | | |
|---|---|---|---|
| 4,125,480 | 11/1978 | Maxwell | 252/414 |
| 4,389,338 | 6/1983 | Mitsuhata et al. | 252/463 |
| 4,645,754 | 2/1987 | Tamura et al. | 502/527 |
| 4,769,358 | 9/1988 | Kishimoto et al. | 502/348 |
| 5,077,256 | 12/1991 | Yamamoto et al. | 502/243 |
| 5,395,812 | 3/1995 | Nagase et al. | 502/238 |

FOREIGN PATENT DOCUMENTS

| | | | |
|---|---|---|---|
| 0 211 521 A1 | 2/1987 | European Pat. Off. | B01J 23/66 |
| 0 229 465 A1 | 7/1987 | European Pat. Off. | B01J 23/66 |
| 0 764 464 A2 | 3/1997 | European Pat. Off. | B01J 23/66 |
| 2 368 298 | 5/1978 | France | B01J 23/96 |
| 2 497 803 | 7/1982 | France | C07D 303/04 |
| 62-087246 | 4/1987 | Japan | B01J 23/66 |
| 62-114654 | 5/1987 | Japan | B01J 23/66 |

*Primary Examiner*—Ba K. Trinh
*Attorney, Agent, or Firm*—Fish & Richardson P.C.

[57] ABSTRACT

A silver catalyst excelling in catalytic performance and permitting production of ethylene oxide with a high selectivity for a long time, a method for the production of ethylene oxide by the use of the silver catalyst, and a method for ideal manufacture of the silver catalyst are disclosed. The silver catalyst is formed by depositing silver on a carrier having $\alpha$-alumina as a main component and used for the production of ethylene oxide, which carrier of the silver catalyst has undergone the following treatment capable of yielding a wash exhibiting a resistivity index of not less than 10,000 $\Omega\cdot$cm (25° C.):
(Method of treatment)

In a conical beaker having an inner volume of 500 ml, 300 ml of the carrier is placed, dried therein at 120° C. for two hours, and boiled in conjunction with (water absorption +220) ml of pure water added thereto under normal pressure at 90° C. for 30 minutes, providing that the term "water absorption" as used herein refers to what is expressed by the following formula (1):

Water absorption=[300 (ml)×packing specific gravity (g/ml)×water absorption (wt. %)]/[Specific gravity of water (g/ml)]  (1)

14 Claims, No Drawings

SILVER CATALYST FOR PRODUCTION OF ETHYLENE OXIDE, METHOD FOR PRODUCTION THEREOF, AND METHOD FOR PRODUCTION OF ETHYLENE OXIDE

BACKGROUND OF THE INVENTION

1. Field of the Invention

This invention relates to a silver catalyst for the production of ethylene oxide, a method for the manufacture of the catalyst, and a method for the production of ethylene oxide, and more particularly to a silver catalyst excelling in catalytic performance and allowing production of ethylene oxide with a high selectivity for a long time, a method for the production of ethylene oxide by the use of the silver catalyst, and a completely satisfying method for the manufacture of the silver catalyst.

2. Description of the Related Art

The production of ethylene oxide by the catalytic gas phase oxidation of ethylene with molecular oxygen in the presence of a silver catalyst has been widely practiced on the commercial scale. As concerns the silver catalyst to be used for the catalytic gas phase oxidation, numerous inventions covering carriers for the catalyst, methods for deposition of the catalyst on a carrier, reaction accelerators for the catalysis, etc. have been filed for patents.

For example, the silver catalyst formed by depositing silver and at least one promoter selected from the group consisting of alkali metals and alkali metal compounds on a porous carrier of a specific shape (U.S. Pat. No. 4,645,754, U.S. Pat. No. 4,769,358, etc.) and the silver catalyst formed by depositing silver and cesium on an $\alpha$-alumina carrier having the surface thereof coated with amorphous silica or amorphous silica-alumina (U.S. Pat. No. 5,077,256, U.S. Pat. No. 5,395,812, etc.) have been known.

Notwithstanding these silver catalysts have the selectivity thereof already exalted to high levels, the fact that their selectivity are still desired to be further improved is logically explained by appreciating the scale of production of ethylene oxide which is so large that the increase of only 1% in the selectivity brings an extremely high economic effect of allowing a notable saving of the raw material ethylene. By the same token, the improvement of the silver catalyst in service life and in durability brings an enormous economic effect.

In the circumstances, the development of a silver catalyst which is further improved in such catalytic qualities as activity, selectivity, and service life has been a constant theme to be pursued by researchers in the pertinent technological field.

An object of this invention, therefore, is to provide a silver catalyst which excels in catalytic performance and permits production of ethylene oxide with a high selectivity for a long time, a method for the production of ethylene oxide by the use of the silver catalyst, and a method for completely satisfactory manufacture of this silver catalyst.

SUMMARY OF THE INVENTION

We have directed our particular notice to a carrier to be used in the manufacture of a silver catalyst and have continued a diligent study on the carrier and consequently discovered that when a popularly accepted carrier having $\alpha$-alumina as a main component thereof is washed with water, the silver catalyst to be obtained by using the washed carrier excels in catalytic performance. We have perfected the present invention on the basis of this knowledge.

To be specific, the object mentioned above is accomplished by a silver catalyst formed by depositing silver on a carrier having $\alpha$-alumina as a main component thereof and used for the production of ethylene oxide, the carrier of the silver catalyst having undergone the following treatment which yields a wash exhibiting a resistivity index of not less than 10,000 $\Omega \cdot$cm (25° C.):

(Method of treatment)

In a conical beaker having an inner volume of 500 ml, 300 ml of the carrier is placed, dried therein at 120° C. for 2 hours, and boiled in conjunction with (water absorption +220) ml of pure water added thereto under normal pressure at 90° C. for 30 minutes, providing that the term "water absorption" as used herein refers to what is expressed by the following formula (1):

$$\text{Water absorption} = [300 \text{ (ml)} \times \text{packing specific gravity (g/ml)} \times \text{water absorption (wt. \%)}]/[\text{Specific gravity of water (g/ml)}] \quad (1)$$

The object mentioned above is further accomplished by a method for the manufacture of a catalyst formed by depositing silver on a carrier having $\alpha$-alumina as a main component thereof and used for the production of ethylene oxide, the carrier of the silver catalyst having been washed with cold water.

The object is also accomplished by a method for the production of ethylene oxide, the production of ethylene oxide being attained by the gas phase oxidation of ethylene in the presence of the silver catalyst mentioned above.

The catalyst of this invention for the production of ethylene oxide excels in activity, selectivity, and service life and permits ethylene oxide to be produced with a high selectivity for a long time.

DESCRIPTION OF THE PREFERRED EMBODIMENT

The catalyst of this invention for the production of ethylene oxide, as described above, is a silver catalyst formed by depositing silver on a carrier having $\alpha$-alumina as a main component thereof and used for the production of ethylene oxide, and characterized by the fact that the carrier has undergone the following treatment which yields a wash exhibiting a resistivity index of not less than 10,000 $\Omega \cdot$cm (25° C.), preferably not less than 15,000 $\Omega \cdot$cm (250):

(Method of treatment)

In a conical beaker having an inner volume of 500 ml, 300 ml of the carrier is placed, dried therein at 120° C. for 2 hours, and boiled in conjunction with (water absorption +220) ml of pure water added thereto under normal pressure at 90° C. for 30 minutes, providing that the term "water absorption" as used herein refers to what is expressed by the following formula (1):

$$\text{Water absorption} = [300 \text{ (ml)} \times \text{packing specific gravity (g/ml)} \times \text{water absorption (wt. \%)}] \div [\text{Specific gravity of water (g/ml)}] \quad (1)$$

The term "packing specific gravity" (D) used in the formula (1) mentioned above means what is expressed by the formula, $D = W_1 \text{ (g)}/1000 \text{ ml}$, wherein $W_1$ is a weight of a dry carrier which fills a measuring cylinder, 1000 ml in inner volume, when the dry carrier is packed in the measuring cylinder at a rate of 2000 ml/minute.

The term "water absorption" (M) means what is expressed by the formula, $M = [\{W_1 \text{ (g)} - W_2 \text{ (g)}\}/W_2 \text{ (g)}] \times 100$, wherein $W_2$ is a weight of the dry carrier, 300 ml in volume, and $W_3$ is a water-holding weight of the carrier found by weighing the carrier prepared by placing a sample dry carrier, 300 ml in volume, in a basket made of stainless steel, boiling the sample for 30 minutes in boiling pure water, then removing the boiled carrier from the pure water, and wiping the wet carrier on a wet piece of gauze until the carrier is deprived of an excess water.

The carrier itself which is formed mainly of α-alumina and used in this invention is not particularly restricted so long as it fulfills the requirements mentioned above. A carrier formed mainly of α-alumina which is usable for the production of a silver catalyst intended to produce ethylene oxide by the gas phase oxidation of ethylene and which is generally known as usable for this purpose (hereinafter referred to occasionally as "carrier") fits the use herein. Besides the α-alumina, this carrier permits inclusion therein of alumina oxide, particularly amorphous alumina, silica, silica alumina, mullite, and zeolite; alkali metal oxides and alkaline earth metal oxides such as potassium oxide cesium oxide; and transition metal oxides such as iron oxide and titanium oxide. It may further incorporate therein such compounds as, for example, compounds of rhenium and molybdenum which has been generally known as available for the purpose of improving the silver catalyst in performance.

The carrier does not need to impose any restriction on the shape, size, and physical properties thereof but permits suitable selection thereof. As concerns the physical properties, for example, it has a BET specific surface area in the range of 0.03–10 $m^2/g$, preferably 0.1–5 $m^2/g$, and more preferably 0.5–2 $m^2/g$. The coefficient of water absorption of the carrier is in the range of 10–70%, preferably 20–60%, and more preferably 30–50%. The average pore diameter is in the range of 0.1–5 $\mu m$, preferably 0.2–3 $\mu m$, and more preferably 0.3–0.9 $\mu m$. The porosity is in the range of 20–80%, preferably 30–70%. The particles of the carrier have a shape selected from among sphere, cylinder, Raschig ring, and saddle ring. The average equivalent diameter of the particles is in the range of 0.1–30 mm, preferably 1–15 mm.

This invention is characterized by using a carrier such that the treatment performed thereon yields a wash exhibiting a resistivity index of not less than 10,000 $\Omega \cdot cm$ (25° C.). To be specific, the carrier to be used has a quality such that when a sample thereof, 300 ml in volume, is placed in a conical beaker of an inner volume of 500 ml, dried therein at 120° C. for 2 hours, then boiled in conjunction with pure water added thereto in a volume of (water absorption+220) ml under normal pressure at 90° C. for 30 minutes, the wash yielded consequently exhibits a resistivity index exceeding 10,000 $\Omega \cdot cm$ (25° C.), preferably falling in the range of 15,000–1,000,000 $\Omega \cdot cm$ (25° C.), and more preferably in the range of 20,000–1,000,000 $\Omega \cdot cm$ (25° C.).

The term "wash" as used herein means the water remaining after the washing mentioned above, generally the water which remains after the separation of the carrier. The term "resistivity index" means the reciprocal of the electric conductivity of the wash measured at 25° C. with a conductivity meter. In this invention, it is indicated as 10,000 $\Omega \cdot cm$ (25° C.), for example, when the resistivity index is 10,000 $\Omega \cdot cm$.

The carrier which exhibits a resistivity index exceeding 10,000 $\Omega \cdot cm$ (25° C.) after the treatment mentioned above can be manufactured completely satisfactorily by washing the carrier with water, preferably with pure water.

One of the specific washing methods consists in repeating an operation of boiling the sample under a normal pressure at 90° C. for 30 minutes till the resistivity index of the wash exceeds 10,000 $\Omega \cdot cm$ (25° C.), preferably falls in the range of 15,000–1,000,000 $\Omega \cdot cm$ (25° C.), particularly preferably in the range of 20,000–1,000,000 $\Omega \cdot cm$ (25° C.). The aforementioned operation which is performed just once suffices when the wash yielded thereby exhibits a resistivity index exceeding 10,000 $\Omega \cdot cm$ (25° C.). When this operation is repeated a plurality of times, fresh cold water is used each time the operation is repeated and the wash yielded in each of the repeated operations is measured for resistivity index. The amount of the water to be used is not particularly restricted. When the carrier in use has a volume of 300 ml, for example, the water is used in the amount of (water absorption+220 ml) in the first round of operation and in the amount of 220 ml each in the second and following rounds of operation.

The washing with water mentioned above may be preceded by the washing with an aqueous solution of an inorganic acid such as, for example, nitric acid or an organic solvent such as, for example, alcohol. When this preliminary washing is made with an aqueous nitric acid solution, for example, an operation of boiling under normal pressure at 90° C. is preferred to be repeated. Though the subsequent washing with water is still indispensable in this case, the boiling in this washing does not need to be performed under normal pressure at 90° C.

By washing the carrier with water as described above or by using the carrier which, in consequence of the aforementioned treatment, yields a wash exhibiting a resistivity index of not less than 10,000 $\Omega \cdot cm$ (25° C.), the silver catalyst to be obtained for use in the production of ethylene oxide is enabled to acquire a fully satisfactory catalytic performance.

The silver catalyst of this invention for the production of ethylene oxide can be manufactured by following the known procedure while using the carrier described above instead. To be specific, this manufacture only requires substances popularly used as a reaction accelerator and a reaction auxiliary to be deposited besides silver on the carrier in accordance with the standard procedure. As typical examples of the reaction accelerator, alkali metals, specifically potassium, rubidium, cesium, and mixtures thereof may be cited. Among other alkali metals mentioned above, cesium is used particularly suitably.

Specifically, the catalyst for the production of ethylene oxide can be obtained, as disclosed in JP-A-62-114,654, by impregnating the carrier with an aqueous solution prepared in advance by dissolving a silver salt such as, for example, silver nitrate, silver carbonate, silver oxalate, silver acetate, silver propionate, silver lactate, silver citrate, or silver neodecanoate and a complex-forming agent as triethanol amine, ethylene diamine, or propylene diamine, drying the impregnated carrier, and then heat-treating the dried carrier in an oxidizing atmosphere such as air at a temperature in the range of 1000–400° C., preferably in the range of 2000–300° C., thereby causing deposition of the metallic silver in the form of minute particles on the inner and outer surfaces of the carrier. The reaction accelerator or other similar substance, optionally prior to the impregnation of the carrier with the aforementioned solution, may be dissolved in the aqueous silver amine complex solution and the resultant solution may be used simultaneously in the impregnation or may be deposited on the carrier after the deposition of silver.

The amounts of the silver, the reaction accelerator, and the reaction auxiliary to be deposited on the carrier do not need to impose any particular restriction but require only to suffice effective manufacture of ethylene oxide by the gas phase oxidation of ethylene. In the case of the silver, the amount thereof to be deposited is in the range of 1–30% by weight, preferably 5–20% by weight, based on the weight of the silver catalyst to be used for the production of ethylene oxide. In the case of the alkalimetal, the amount thereof to be deposited is in the range of 0.01–100 µmols/m², preferably 0.1–5 µmols/m², based on the surface area of the silver catalyst to be used for the production of ethylene oxide.

The manufacture of ethylene oxide by the gas phase oxidation of ethylene in the presence of the catalyst of this invention for use in the production of ethylene oxide does not impose any particular restriction but requires only to adopt specifically the aforementioned catalyst intended for the production of ethylene oxide. It can be fulfilled by following a procedure which is usable for reactions of this kind and is popularly known as used therefor.

The conditions generally prevailing in the production on the commercial scale, namely a reaction temperature in the range of 150°–300° C., preferably 180°–280° C., a reaction pressure in the range of 2–40 kg/cm² G, preferably 10–30 kg/cm² G, and a space velocity in the range of 1,000–30,000 hr$^{-1}$ (SV), preferably 3,000–8,000 hr$^{-1}$ (SV) are adopted. The feed gas which is passed through the catalyst is preferred to have a composition containing 0.5–30 vol. % of ethylene, 5–30 vol. % of carbon dioxide gas, and the balance of an inert gas such as nitrogen, argon, or steam and lower hydrocarbons such as methane and ethane and further containing as a reaction inhibitor 0.1–10 ppm (by volume) of a halide such as ethylene dichloride or ethyl chloride.

As typical examples of the molecular oxygen-containing gas to be used in this invention, air, oxygen, and enriched air may be cited.

The magnitudes of degree of conversion and selectivity mentioned in the following examples and control are the results of calculation according to the following formulas.

Conversion (%)=[(Number of mols of ethylene consumed in the reaction)/(Number of mols of ethylene contained in the feed gas)]×100

Selectivity (%)=[(Number of mols of ethylene converted to ethylene oxide)/(Number of mols of ethylene consumed in the reaction)]×100

Now, this invention will be described more specifically below by reference to working examples. The electric conductivity referred to therein was measured with a conductivity meter (made by Toa Dempa Kogyo K.K. and sold under the trademark designation of "Toa Conductivity Meter CM-11P").

EXAMPLE 1

Three liters of a carrier having α-alumina as a main component (having 4/16-inch rings packed in a ratio of 0.70 g/ml and exhibiting a porosity of 57%, and a water absorption ratio of 38%) was washed by being boiled in three liters of distilled water at 90° C. for 30 minutes.

The carrier washed as described above was dried thoroughly at 120° C., then impregnated with a complex solution consisting of 573 g of silver oxalate, 386 ml of monoethanol amine, 44 ml of water, and 5.3 g of cesium nitrate, subsequently concentrated by heating, further dried at 120° C. for 1 hour, and heat-treated in a stream of air at 280° C. for 48 hours. Thereafter, the resultant composite was heat-treated in an atmosphere of nitrogen at 530° C. for 3 hours to obtain a silver catalyst (A) for the production of ethylene oxide.

A 300 ml portion of the carrier washed as described above was placed in a 500 ml conical beaker, dried therein at 120° C. for two hours, and boiled in conjunction with 300 ml [=(300×0.70×0.38)+220] of pure water added thereto under normal pressure at 90° C. for 30 minutes. The wash remaining after the separation of the carrier from the boiled mass was found by the measurement of electric conductivity to have a resistivity index of 14,100 Ω·cm (25° C.).

EXAMPLE 2

Three liters of the same carrier as used in Example 1 was washed by being boiled in conjunction with 3 liters of pure water added thereto at 90° C. for 30 minutes. The washed carrier was separated from the enveloping water and subsequently washed by being boiled in conjunction with 2 liters of pure water added anew thereto at 90° C. for 30 minutes.

Subsequently, a silver catalyst (B) for the production of ethylene oxide was obtained by following the procedure of Example 1 while using the carrier washed as described above instead.

A 300 ml portion of the carrier washed as described above was placed in a 500 ml conical beaker, dried therein at 120° C. for 2 hours, and boiled in conjunction with 300 ml of pure water added thereto under normal pressure at 90° C. for 30 minutes. The wash remaining after the separation of the carrier from the boiled mass was found by the measurement of electric conductivity to have a resistivity index of 18,500 Ω·cm (25° C.).

EXAMPLE 3

Three liters of the same carrier as used in Example 1 was washed by being boiled in conjunction with 3 liters of pure water added thereto at 90° C. for 30 minutes. Then, an operation of separating the washed carrier from the enveloping water and subsequently washing the carrier by being boiled in conjunction with 2 liters of pure water added anew thereto at 90° C. for 30 minutes was performed up to 2 repetitions.

Subsequently, a silver catalyst (C) for the production of ethylene oxide was obtained by following the procedure of Example 1 while using the carrier washed as described above instead.

A 300 ml portion of the carrier washed as described above was placed in a 500 ml conical beaker, dried therein at 120° C. for 2 hours, and boiled in conjunction with 300 ml of pure water added thereto under normal pressure at 90° C. for 30 minutes. The wash remaining after the separation of the carrier from the boiled mass was found by the measurement of electric conductivity to have a resistivity index of 21,900 Ω·cm (25° C.).

Control 1

Three hundred (300) ml of the same carrier as used in Example 1 was placed in a 500 ml conical beaker, dried therein at 120° C. for 2 hours, and then boiled in conjunction with 300 ml of pure water added thereto under normal pressure at 90° C. for 30 minutes. The wash remaining after the separation of the carrier from the washed mass was found by the measurement of electric conductivity to have a resistivity index of 8,800 Ω·cm (25° C.).

Subsequently, a silver catalyst (D) for the production of ethylene oxide was obtained by following the procedure of Example 1 while using the unwashed carrier described above instead.

EXAMPLE 4

The catalysts (A)–(D) obtained in Examples 1–3 and Control 1 were independently pulverized and classified to obtain separate portions, 600–850 meshes in size. In a reaction tube of stainless steel measuring 3 mm in inside diameter and 600 mm in length, 1.2 g samples of the portions were independently placed and subjected to catalytic gas phase oxidation of ethylene under the following conditions. The selectivity coefficient of the oxidation and the reaction temperature of the catalyst bed were measured when the degree of conversion of ethylene was 10%. The results are shown in Table 1.

(Reaction conditions)

Temperature of heating medium: 230° C.

Spatial velocity (SV): 5500 hr$^{-1}$

Reaction pressure: 20 kg/cm$^2$

Composition of feed ethylene gas: 21% of ethylene, 7.8% of oxygen, 5.7% of carbon dioxide, 2 ppm of ethylene dichloride, and balance of (methane), nitrogen, argon, and ethane)

TABLE 1

| Catalyst | | Resistivity index (Ω.cm) | Selectivity coefficient (%) | Reaction temperature (° C.) |
|---|---|---|---|---|
| Example 1 | A | 14100 | 81.0 | 242 |
| Example 2 | B | 18500 | 81.1 | 240 |
| Example 3 | C | 21900 | 81.2 | 239 |
| Control 1 | D | 8800 | 79.8 | 256 |

The entire disclosure of Japanese Patent Application No. 10-038327 filed on Feb. 20, 1998, including specification, claims, and summary are incorporated herein by reference in its entirety.

What is claimed is:

1. A silver catalyst formed by depositing silver on a carrier having α-alumina as a main component thereof and used for the production of ethylene oxide, said carrier of said silver catalyst having undergone the following treatment which yields a wash exhibiting a resistivity index of not less than 10,000 Ω·cm (25° C.):

(Method of treatment)

In a conical beaker having an inner volume of 500 ml, 300 ml of said carrier is placed, dried therein at 120° C. for 2 hours, and boiled in conjunction with (water absorption +220) ml of pure water added thereto under normal pressure at 90° C. for 30 minutes, providing that the term "water absorption" as used herein refers to what is expressed by the following formula (1):

Water absorption=[300 (ml)×packing specific gravity (g/ml)×water absorption (wt. %)]÷[Specific gravity of water (g/ml)]    (1).

2. A catalyst according to claim 1, wherein the amount of silver to be deposited is in the range of 1–30 wt. %, based on the amount of a completed catalyst.

3. A catalyst according to claim 2, wherein an alkali metal is deposited at a rate in the range of 0.01–100 μmol/m$^2$, based on the surface area of said catalyst.

4. A catalyst according to claim 1, wherein said carrier possesses a BET specific surface area in the range of 0.03–10 m$^2$/g, a coefficient of water absorption in the range of 10–70%, and an average pore diameter in the range of 0.1–5 μm.

5. A catalyst according to claim 1, wherein said resistivity index is not less than 15,000 Ω·cm (25° C.).

6. A method for the preparation of a silver catalyst formed by depositing silver on a carrier having α-alumina as a main component thereof and used for the production of ethylene oxide, said carrier having been washed with water.

7. A method according to claim 6, wherein the following treatment performed on said carrier subsequently to said washing with water yields a wash exhibiting a resistivity index of not less than 10,000 Ω·cm (25° C.)

(Method of treatment)

In a conical beaker having an inner volume of 500 ml, 300 ml of said carrier is placed, dried therein at 120° C. for two hours, and boiled in conjunction with (water absorption +220) ml of pure water added thereto under normal pressure at 90° C. for 30 minutes, providing that the term "water absorption" as used herein refers to what is expressed by the following formula (1):

Water absorption=[300 (ml)×packing specific gravity (g/ml)×water absorption (wt. %)]÷[Specific gravity of water (g/ml)]    (1).

8. A method according to claim 6 or claim 7, which comprises causing an aqueous solution of a silver salt and an amine type complex-forming agent to impregnate a carrier undergone a treatment with water which yields a wash exhibiting a resistivity index of not less than 10,000 Ω·cm (25° C.), drying the impregnated carrier, and thereafter heat-treating the dried carrier in an oxidizing atmosphere at a temperature in the range of 100–400° C. thereby allowing the metallic silver to be deposited on the inner and outer surfaces of said carrier.

9. A method according to claim 6, wherein a reaction accelerator is dissolved and deposited in an aqueous amine complex solution prior to the impregnation of said carrier with said aqueous solution.

10. A method according to claim 6, wherein said reaction accelerator is deposited in said carrier subsequently to the deposition of silver.

11. A method according to claim 10, wherein the amount of silver to be deposited is in the range of 1–30 wt. % based on the amount of a completed catalyst.

12. A method according to claim 11, wherein an alkali metal is deposited on the surface of said catalyst at a rate in the range of 0.01–100 μmols/m$^2$.

13. A method according to claim 10, wherein said carrier possesses a BET specific surface area in the range of 0.03–10 m$^2$/g, a water absorption in the range of 10–70%, and an average pore diameter in the range of 0.1–5 μm.

14. A method for the production of ethylene oxide, which comprises subjecting ethylene to gas phase oxidation with a molecular oxygen-containing gas in the presence of a catalyst set forth in claim 1.

* * * * *